United States Patent Office 3,498,961
Patented Mar. 3, 1970

3,498,961
POLYMERIZATION OF 1,3-CYCLOPENTADIENE
James J. Tazuma, Stow, Ohio, assignor to The Goodyear Tire & Rubber Company, Akron, Ohio, a corporation of Ohio
No Drawing. Filed May 10, 1967, Ser. No. 637,330
Int. Cl. C08d 1/14
U.S. Cl. 260—93.1          4 Claims

ABSTRACT OF THE DISCLOSURE

A process for the polymerization of 1,3-cyclopentadiene to form a solid polymer containing no appreciable gel content is disclosed. The catalyst employed is a two-component system comprising a mixture of an alkyl aluminum halide such as dialkyl aluminum halides or alkyl aluminum dihalides or mixtures thereof in mixture with a transition metal halide of tungsten.

---

This invention is directed to the polymerization of 1,3-cyclopentadiene. More specifically it is directed to the polymerization of 1,3-cyclopentadiene to form solid polymers containing no appreciable gel content and in which the cyclic nature of the 1,3-cyclopentadiene is retained in the polymer.

Methods are known to polymerize 1,3-cyclopentadiene to form low molecular weight polymers; however, these methods usually produce polymers of 1,3-cyclopentadiene which contain appreciable amounts of gel.

It is an object, therefore, of this invention to provide a method to polymerize cyclopentadiene to form solid polymers containing no appreciable amount of gel and in which the cyclic nature of the monomer is preserved in the polymer. It is a further object to provide a novel and solid polymer of cyclopentadiene containing no appreciable amount of gel. Other objects will appear as the description proceeds.

According to the present invention, a method is provided for polymerizing 1,3-cyclopentadiene to form a solid polymer containing no appreciable gel content which comprises contacting 1,3-cyclopentadiene, under polymerization conditions, with a catalyst comprising a mixture of (1) at least one alkyl aluminum halide selected from the group consisting of alkyl aluminum dihalides and dialkyl aluminum halides and (2) at least one tungsten halide.

The polymers formed in accordance with the practice of this invention are relatively gel free. These polymers also retain the cyclic nature of the cyclopentadiene even when formed in the polymers. Analytical data indicate that the monomer 1,3-cyclopentadiene is converted into polymers containing both 1,2 addition linkages and 1,4 addition linkages. These two types of addition compounds are described graphically as:

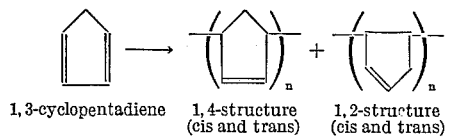

1,3-cyclopentadiene   1,4-structure   1,2-structure
                      (cis and trans)  (cis and trans)

The polymers resulting from the practice of this invention may be characterized in that they contain more than 50% of the monomer segments in the 1,2 configuration with the remainder being mostly 1,4 configuration.

As is indicated the catalyst system employed in this invention is a two-component system. The first component of the catalyst is an alkyl aluminum halide which can be a dialkyl aluminum monohalide or an alkyl aluminum dihalide or mixtures thereof.

Representative of such compounds are ethyl aluminum dichloride, diethyl aluminum chloride, n-propyl aluminum dichloride, di-n-propyl aluminum chloride, isopropyl aluminum dichloride, diisopropyl aluminum chloride, n-butyl aluminum dichloride, di-n-butyl aluminum chloride, ethyl aluminum dibromide, diethyl aluminum bromide, n-butyl aluminum dibromide, di-n-butyl aluminum bromide, n-propyl dibromide, di-n-propyl aluminum bromide, ethyl aluminum difluoride, diethyl aluminum fluoride, n-propyl aluminum difluoride, di-n-propyl aluminum fluoride, isopropyl aluminum difluoride, diisopropyl aluminum fluoride, n-butyl aluminum difluoride and di-n-butyl aluminum fluoride. Also included are the complex alkyl aluminum halides such as ethyl aluminum sesquichloride, ethyl aluminum sesquibromide and ethyl aluminum sesquifluoride. Other monoalkyl aluminum dihalides and other dialkyl monohalides containing alkyl groups of from 2 to about 8 carbon atoms may also be employed.

The polyhalides of tungsten may be represented by tungsten hexafluoride, tungsten hexabromide, tungsten hexachloride, tungsten pentachloride, tungsten pentabromide and tungsten pentafluoride.

It is generally preferred to use a catalyst combination of an alkyl aluminum dihalide and tungsten hexahalide and more particularly a combination of alkyl aluminum dichloride and tungsten hexachloride.

The polymerization is usually conducted in a solvent or diluent and, therefore, is a solution polymerization. Representative of suitable solvents are benzene, toluene and other aromatic compounds which are easily liquified by heating such a naphthylene, mesitylene; aliphatic solvents such as hexane, pentane, heptane, octane, cyclohexane and cyclooctane may also be used. Substituted hydrocarbons wherein the substituents are inert may also be employed. Representative of such are dichloromethane, chloroform, chlorobenzene and the like.

The amount of solvent employed, of course, depends on a number of factors and may vary from a monomer solvent volume ratio of from 1/1 or lower to 20/1 or higher. However, it is usually more convenient to employ a ratio of 2/1 to 3/1.

The temperatures employed in the polymerization of this invention are not critical and may vary between the freezing point of the liquid system and extremely high temperatures such as 150° C. However, a more convenient temperature in which to conduct the polymerization is somewhat between room temperature and about 50° C.

In the practice of this invention it is usually more desirable to employ air-free and moisture-free techniques and also to employ relatively pure catalyst components, monomer and solvent.

The relationship between the two catalyst components should vary in mole ratio of the alkyl aluminum halide/tungsten halide (Al/W) in the range from about 2/1 to about 3/1. If these limits are exceeded gel formation is observed in the polymer, unles extensive dilution of the polymerization system is employed. At low concentrations of monomer in the polymerization system, gel is not observed in the polymer at mole ratios slightly above and slightly below the limits mentioned above.

If desired, the catalyst system of this invention can be modified by the introduction of small amounts of a third component containing an active hydrogen. Representative of such modifiers are alcohols, amines, mercaptans and other simple hydrogen-containing compounds.

The amount of catalyst employed to affect the polymerization of the 1,3-cyclopentadiene may vary considerably. Of course, sufficient catalyst must be employed to initiate the reaction, and thus, a catalytic amount is required. It has been found that efficient and rapid polymerizations can be obtained when the catalyst concentration varies from about $5 \times 10^{-4}$ to about $20 \times 10^{-4}$ moles of the tungsten halide per mole of 1,3-cyclopentadiene.

The practice of this invention is further illustrated by reference to the following example which is intended to be representative rather than restrictive of the scope of the invention. Unless otherwise noted, all parts and percentages are by weight.

EXAMPLE I

To a 4-ounce bottle fitted with a septum cap was charged under nitrogen 50 cubic centimeters (cc.) of dry benzene, 2 cc. of a 0.05 molar tungsten hexachloride in benzene, and 2 cc. of a 0.1 molar ethyl aluminum dichloride in benzene to give an Al/W mole ratio of 2/1. The mixture was shaken a few minutes and 9.0 grams of freshly prepared 1,3-cyclopentadiene (90% purity) was charged to the bottle. The mixture, which became warm, was shaken and allowed to stand for one hour. The catalyst was deactiviated with a sufficient amount of tetraethylene pentamine. The polymer was stabilized with 2,6-ditertiary-butyl-para-cresol, coagulated with 100 cc. of methanol and dried to a constant weight in vacuo. The yield of polymer was 5.1 grams or a conversion of 63% by weight. The product was a white slightly elastic material with a dilute solution viscosity (DSV) of 0.2. X-ray analysis indicated an amorphous material while the Nuclear Magnetic Resonance Analysis suggested the polymer to be a polycyclopentadiene with 70% 1,2-linkages and 30% 1,4-linkages.

EXAMPLE II

In a small vial, an experiment was conducted in which 3 grams of 1,3-cyclopentadiene was polymerized with 1 cc. of 0.05 molar tungsten hexachloride and benzene and 1 cc. of 0.1 molar ethyl aluminum dichloride. This constituted an Al/W mole ratio of 2/1. There was no detectable gel in the resulting polymer. The polymer had the appearance of the polymer produced in Example I.

EXAMPLE III

An experiment similar to that of Example II was conducted except that the amount of ethyl aluminum dichloride was 1.5 cc. instead of 2 cc. No apparent gel was observed and the polymer was essentially the same as Example I.

While certain representative embodiments and details have been shown for the purpose of illustrating the invention, it will be apparent to those skilled in this art that various changes and modifications may be made therein without departing from the spirit or scope of the invention.

What is claimed is:

1. A method of polymerizing 1,3-cyclopentadiene to form solid polymers containing no appreciable gel which comprises contacting 1,3-cyclopentadiene under polymerization conditions with a catalyst comprising a mixture of (1) at least one alkyl aluminum halide selected from the group consisting of alkyl aluminum dihalides and dialkyl aluminum halides and (2) at least one tungsten halide in which the mole ratio of the alkyl aluminum halide/tungsten halide ranges from 2/1 to about 3/1.

2. The method according to claim 1 in which the catalyst is an alkyl aluminum dihalide and a tungsten hexahalide.

3. The method according to claim 1 in which the polymerization is conducted in an inert solvent.

4. The method according to claim 2 in which the catalyst is a tungsten hexachloride and alkyl aluminum dichloride.

References Cited

UNITED STATES PATENTS 3,449,310  6/1969  Dall'Asta et al. _____ 260—93.1

JAMES A. SEIDLECK, Primary Examiner

R. A. GAITHER, Assistant Examiner

U.S. Cl. X.R.

252—429